United States Patent
Lee

[15] 3,691,574
[45] Sept. 19, 1972

[54] TOOL HOLDING DEVICE
[72] Inventor: James F. Lee, Route 4 Box 119, Darlington, S.C. 29532
[22] Filed: May 3, 1971
[21] Appl. No.: 139,445

[52] U.S. Cl. ............... 10/89 H, 10/129 R, 10/141 H
[51] Int. Cl. .......... B23g 1/02, B23g 1/46, B23g 3/00, B23g 5/08
[58] Field of Search ...... 10/89 F, 89 H, 129 P, 129 R, 10/134, 136 TS, 141 H; 408/238, 239, 240

[56] References Cited

UNITED STATES PATENTS

| | | | |
|---|---|---|---|
| 2,375,554 | 5/1945 | Hook | 10/89 H |
| 2,512,780 | 6/1950 | Spisak | 10/134 |
| 2,723,406 | 11/1955 | Angst | 10/89 H |
| 2,751,614 | 6/1956 | Bourguigon | 10/89 F |
| 2,858,553 | 11/1958 | Bearhalter | 10/89 H |
| 3,371,364 | 3/1968 | Johnson | 10/89 H |
| 3,579,688 | 5/1971 | Keltz et al. | 10/89 F |

FOREIGN PATENTS OR APPLICATIONS 311,978   5/1919   Germany .................. 10/89 H

*Primary Examiner*—Charles W. Lanham
*Assistant Examiner*—E. M. Combs
*Attorney*—Mason, Fenwick & Lawrence

[57] ABSTRACT

A device mountable on a thread cutting machine such as a turret lathe or automatic screw machine, generally including a tool holder support member rigidly mountable on the machine, a tool holder member mounted on the tool holder support member for rotatable and axial movement relative thereto, and means disposed on the tool holder member for mounting thereon a thread forming tool such as a tap or die cutting tool. The device is provided with means for accommodating either a right hand or left hand thread forming tool without having to reset the device each time it is desired to change the type of thread being cut.

26 Claims, 8 Drawing Figures

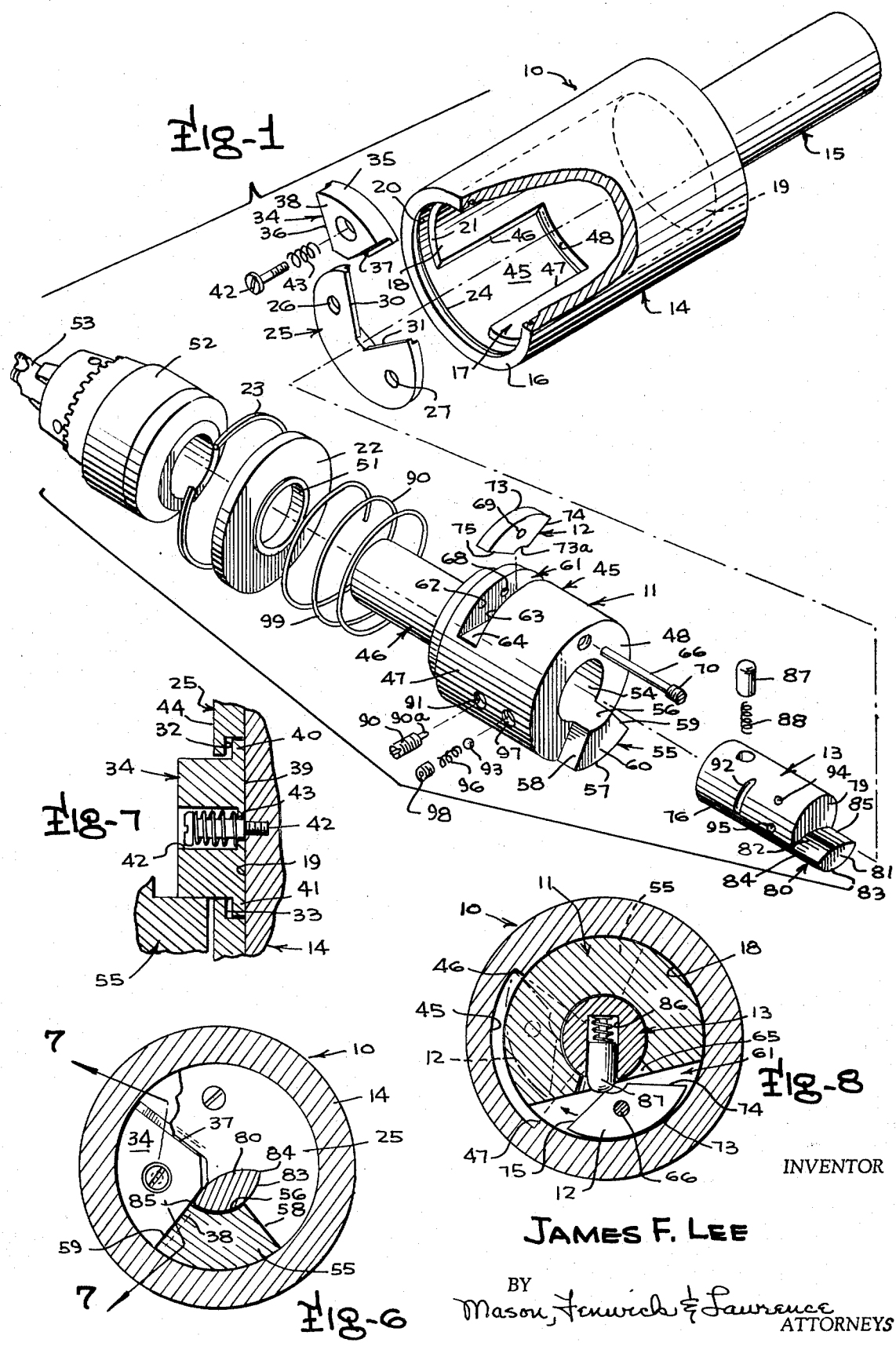

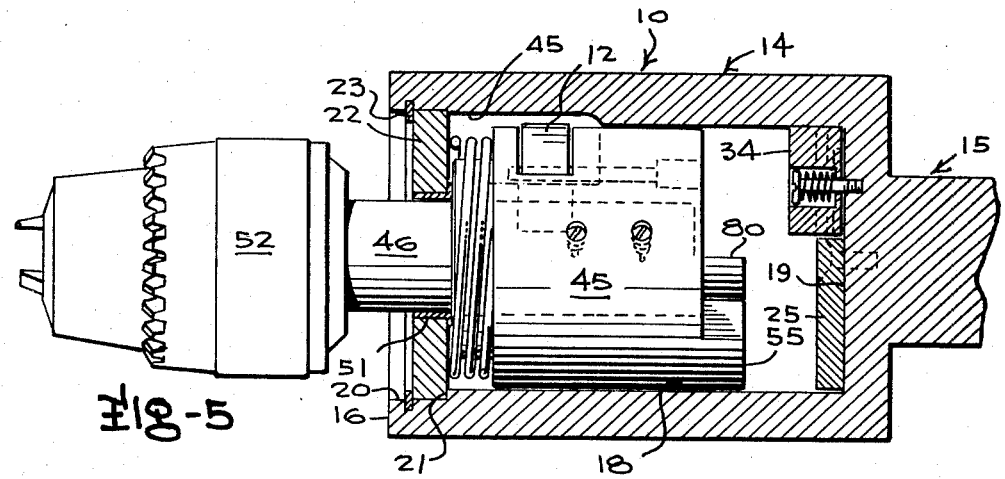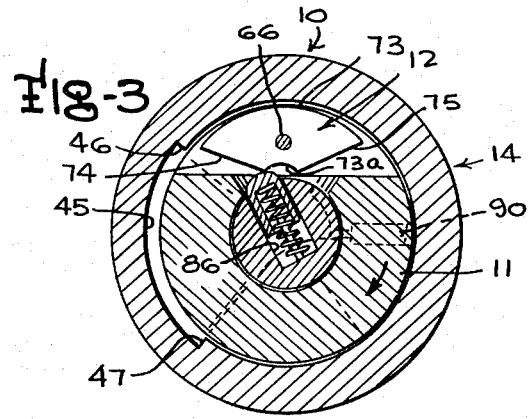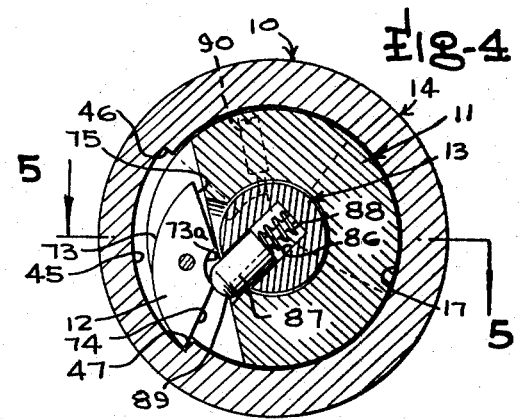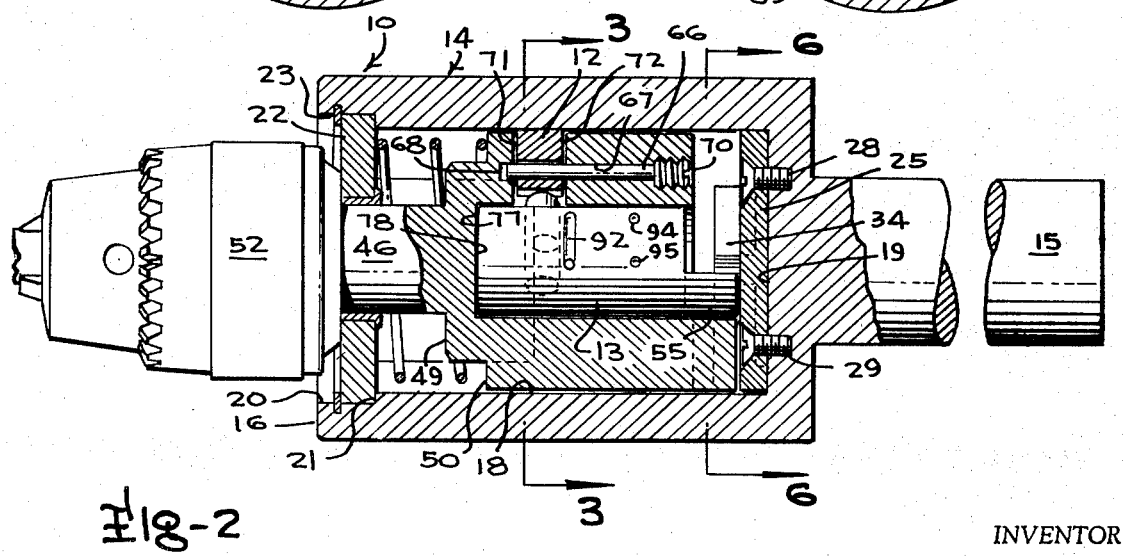

TOOL HOLDING DEVICE

The present invention relates to a tool holding device and more particularly to a tap and die holder device adapted to automatically reset to accommodate either a right hand or left hand thread forming tool.

In the prior art, it has been the conventional practice to either tap or die cut threads on workpieces with the use of either turret lathes or automatic screw machines. Generally, there is provided in such machines, a frame, means for holding a workpiece, rotatably mounted on the frame, means for rotating the workpiece holding means selectively in forward and reverse directions, a mounting means for a tool holder device mounted on a frame, means mounted on the frame operatively connected to the tool holder mounting means for moving the mounting means longitudinally toward and away from the workpiece holding means, means mounted on the frame for limiting the movement of the tool holder mounting means towards the workpiece holding means, and a tool holding device mounted on the tool holder mounting means. In such machines, the workpiece is rotated and the tap or die cutting tool mounted on the tool holder device is held rigid and moved axially toward the rotating workpiece to engage the workpiece and cut the desired thread.

In a conventional thread cutting operation, the thread cutting tool is advanced toward the workpiece and engages and forms the threads in the workpiece until the tool holder mounting means engages a stop on the machine frame which discontinues the feed of the tool. At such point, the rotation of the workpiece holding means, usually a spindle, is reversed to cause the threading tool to ride on the newly formed threads and thus back off of the workpiece. During such procedure, most conventional tool holder devices are adapted to reset to permit the thread forming tool to back off of the workpiece without disturbing the newly formed threads.

In such conventional arrangement, however, whenever it is desired to form a different type of thread, i.e., a left hand thread after having formed a right hand thread or a right hand thread after having formed a left hand thread, it is necessary not only to replace the threading tool but also either to replace the entire tool holder device or to manually reset the components of the holder device. Such replacement on manual resetting of the tool holder device has been found to involve a significant amount of down time in the operation of the machine which correspondingly results in increased machining costs. In view of this, it has been found to be desirable to provide a device for holding a thread forming tool which is adapted to reset automatically to accommodate either a right hand or left hand thread forming tool.

Accordingly, it is the principal object of the present invention to provide a novel tool holding device.

Another object of the invention is to provide a novel device for holding a thread forming tool.

A further object of the invention is to provide a novel device for holding a tap or die cutting tool.

A still further object of the present invention is to provide a novel device for holding either a right hand or left hand thread cutting tool.

Another object of the present invention is to provide a novel device for holding a thread forming tool which is adapted to automatically reset and thus accommodate either a right hand or left hand thread cutting tool.

A further object of the present invention is to provide a novel device for holding either a right hand or a left hand cutting tool mountable in a thread forming machine such as a turret lathe or an automatic screw machine which requires only the replacement of the cutting tool in changing from the cutting of a right hand thread to a left hand thread or a left hand thread to a right hand thread.

A still further object of the present invention is to provide a novel device for holding a thread forming tool such as a tap or die cutting tool having means for automatically resetting to accommodate a tool for forming either a right hand or a left hand thread which is comparably simple in construction, relatively inexpensive to manufacture, and reliable in performance.

Other objects and advantages of the present invention will become more apparent to those persons having ordinary skill in the art to which the present invention pertains, from the following description taken in conjunction with the accompanying drawings wherein:

FIG. 1 is a perspective view of an embodiment of the invention, illustrating the components thereof in exploded relation;

FIG. 2 is a vertical cross-sectional view of the embodiment illustrated in FIG. 1;

FIG. 3 is a cross-sectional view taken along line 3—3 in FIG. 2;

FIG. 4 is a cross-sectional view similar to the view shown in FIG. 3, illustrating the components of the embodiment in sequential operating positions;

FIG. 5 is a cross-section view taken along line 5—5 in FIG. 4;

FIG. 6 is a cross-sectional view taken along line 6—6 in FIG. 2;

FIG. 7 is a cross-sectional view taken along line 7—7 in FIG. 6; and

FIG. 8 is a cross-sectional view similar to the views shown in FIGS. 3 and 4, illustrating the positions of the components for forming an opposite type or left hand thread.

Referring to the drawings, there is illustrated an embodiment of the invention which generally includes a tool holder support member 10, a tool holder member 11 mounted on the tool holder support member 10 for axial and rotational movement relative thereto, a dog 12 pivotally mountable on the tool holder member 11 and engageable with the tool holder support member 10 under predetermined conditions for limiting the rotation of the tool holder member 11 relative to the tool holder support member 10 in selected directions, and an actuating member 13 rotatably mountable in the tool holder member 11 and operatively connected to the dog 12 to set the position of the dog in response to the axial and angular relationship of the tool holder member 11 relative to the tool holder support member 10.

The tool holder support member 10 consists of a cylindrical main body portion 14 and an integral, axially disposed mounting shank portion 15. The shank portion 15 is adapted to be received within an appropriate opening of a tool holder mounting unit such as the turret of a turret lathe, which is adapted to be moved longitudinally to move the tool holder device selectively toward and away from a rotating workpiece. The front face 16 of the main body portion 14 is provided with a cylindrical socket 17 having a cylindrical wall 18 disposed coaxially with the mounting shank portion 15, and a rear end wall 19. The forward end of cylindrical wall 18 is recessed as at 20 to form an annular shoulder 21. The front end of the cylindrical socket 17 is closed by a circular wall member 22 which is received within the recess 20 and engages the annular shoulder 21. The front end wall 22 is retained in position within recess 20 by means of a split retaining ring 23 which is adapted to be inserted in an annular groove 24 formed in the bottom wall of the recess 20, and engages the outer side of front end wall member 22.

Mounted on the rear end wall of the chamber formed by cylindrical socket and closure member 22 is a retainer plate 25 which is provided with a pair of holes 26 and 27 for rigidly securing the retainer plate against end wall 19 with a pair of screws 28 and 29, as best illustrated in FIG. 2. Retainer plate 25 is provided with a cut out section defined by a pair of radially disposed walls 30 and 31 to provide a sector-shaped recess in the rear end of the chamber provided by the cylindrical socket 17 and the front end wall 22 when the retainer plate 25 is rigidly secured to the end wall 19. As best illustrated in FIG. 7, the rearward ends of the walls 30 and 31 are rabetted so that when the retainer plate 25 is mounted on the rear end wall 19, the rabetted edges of walls 30 and 31 will cooperate with the rear end wall 19 to form a pair of radially disposed recesses 32 and 33. Disposed within the sector-shaped recess defined by the end walls 30 and 31, is a movable stop lug 34 provided with an arcuate wall 35 disposed adjacent the circular wall 18, a pair of converging walls 36 and 37 disposed adjacent radially disposed walls 30 and 31 of retainer plate 25, a front wall 38 and a rear wall 39 engageable with end wall 19. As best shown in FIG. 7, the converging walls 36 and 37 are provided with flanges 40 and 41 having thicknesses less than the widths of recesses 32 and 33 to permit longitudinal movement of stop lug 34 relative to retainer plate 25. The extent of travel of stop lug 34 relative to retainer plate 25 is in the order of several thousandths of an inch.

Stop lug 34 is urged into engagement with rear end wall 19 by means of a screw 42 and spring 43. The screw 42 extends through a socket 44 and an opening provided in the bottom of the socket, and is threaded into a threaded hole in rear end wall 19. The spring 43 is interposed between the head of the screw 42 and the bottom annular wall of socket 42, as best shown in FIG. 7. It will be noted that spring 43 will exert a force on stop lug 34 to urge the rear end wall 39 of the lug into engagement with the rear end wall 19. The thickness or longitudinal dimension of stop lug 34 is greater than the thickness or longitudinal dimension of retainer plate 25 so that front wall 34 of lug 25 will be spaced forwardly of front wall 44 of retainer plate 25 to permit unobstructed engagement of the angularly spaced abutment walls 37 and 38 of stop lug 34.

Provided on the cylindrical wall 18 in substantial longitudinal alignment with stop lug 34 is a longitudinally disposed slot 45 forming a pair of circumferentially spaced, radially disposed abutment walls 46 and 47, and an inwardly curved, rear end wall 48.

The tool support member 11 consists of a cylindrical main body portion 45 and an integral, coaxially disposed mounting shank portion 46. The main body portion 45 is mounted in cylindrical socket 17 of the tool holder support member for axial and rotatable movement relative thereto, and is provided with a cylindrical wall 47 mounted on cylindrical wall 18, a rear end wall 48 disposed in opposed, parallel relation to the surface 44 of retainer plate 25, and a front end wall 49 disposed in opposed, parallel relationship with front end wall 22, having a rabetted edge providing an annular shoulder 50, as best illustrated in FIG. 2. The mounting shank portion 46 is cylindrical in shape, having a diameter smaller than the diameter of cylindrical wall 47, and extends through an opening in the end wall member 22, being supported in a bushing 51. A conventional chuck 52 or any other type of device for holding a threading tool, such as a tap 53, is detachably mounted on the free end of a mounting shank portion 46. It will be appreciated that the tool mounting member detachably mounted shank 46 may consist of any type of device for holding either a tap or die cutting tool for cutting either right hand or left hand threads.

Formed in rear end wall 48 of main body portion 45, is an axially disposed bore 54 in which there is mounted the actuating member 13. The rear wall 48 also is provided with an integral, rearwardly extending stop lug 55 having an inner curved surface 56 forming a continuation of the cylindrical surface of bore 54, an outer cylindrical surface 57 forming a continuation of cylindrical wall 47, a pair of radially disposed, angularly spaced abutment walls 58 and 59, and a rear end wall 60 disposed substantially parallel with end wall 48 of main body portion 45 and the front wall 44 of retainer plate 25. The abutment walls 58 and 59 of lug 55 are adapted to engage abutment walls 37 and 38 of stop lug 34 during predetermined axial and angular relationships between tool holder member 11 and tool holder support member 10 to prevent rotation of the tool holder member relative to the tool holder support member, as will later be described in connection with the operation of the device.

The main body portion 45 of the tool holder member further is provided with a transversely disposed slot 61 having a pair of longitudinally spaced, transversely disposed walls 62 and 63, and a bottom wall 64 lying in a plane disposed parallel to the axis of the tool holder member. As best illustrated in FIGS. 2 through 4 and 8, the transverse slot 61 communicates with the front end of bore 54 by means of an opening 65. The dog 12 is positioned within the slot 61 and is pivotally mounted on a pivot pin 66 disposed parallel to the axis of bore 54 so that the dog 12 will pivot in a plane disposed substantially perpendicular to the axis of bore 54. As best shown in FIGS. 1 and 2, the pivot pin 66 extends through aligned openings 67 and 68 in the main body portion 45 and an opening 69 in the dog to retain the dog in slot 61 and permit its pivotal movement in a plane disposed perpendicular to the axis of the bore 54. The pivot pin 66 is retained in position by means of a threaded head portion 70 which is threaded into the threaded rearward end of hole 67.

Mounted on the pivot pin 66 within the slot 61, the dog 12 is provided with parallel front and rear walls 71 and 72 disposed in opposed relation to transverse walls 62 and 63 of slot 61, an outer curved wall 73 having substantially the same or a slightly less radius of curvature as the cylindrical wall 47 of the main body portion 45, an arcuate inner cam surface 73a and a pair of converging, abutment engaging walls 74 and 75. As best illustrated in FIGS. 3 and 4, when the dog 12 is in the dead center position, the entire dog will lie wholly within the transverse slot 61 with the outer arcuate surface 73 lying substantially in or within the cylindrical plane of cylindrical wall 47 of main body portion 45. Whenever, however, the dog 12 may be pivoted about the axis of pin 66, one of the abutment engaging surfaces 74 and 75 will move out of the transverse slot 61 and be caused to engage one of the abutment surfaces 46 and 47 of longitudinal slot 45 to prevent rotation of the tool holder member 45 relative to the tool holder support member in either a forward or reverse direction.

The actuating member 13 is rotatably mounted in the bore 54 and is provided with a cylindrical surface 76 engaging the cylindrical surface of bore 54, a front end wall 77 engaging the end wall 78 of the bore 54, and a rear end wall 79 disposed substantially in alignment with the rear end wall 48 of main body portion 45.

The rear end of actuating member 13 is provided with an integral, rearwardly projecting actuating or shifting lug 80. The lug is provided with a rear wall 81 disposed substantially parallel to rear end wall 79, a curved inner wall 82, an arcuate outer wall 83 forming a continuation of cylindrical wall 76 and engaging the arcuate, inner wall 56 of stop lug 55, and a pair of circumferentially spaced abutment engaging edges 84 and 85. As best illustrated in FIG. 6, the circumferential dimension between the abutment engaging edges 84 and 85 is greater than the circumferential dimension of the inner arcuate surface 56 of stop lug 55 so that when the abutment engaging surface 59 of lug 55 engages the abutment wall 38 of stop lug 34, the edge 85 of lug 80 also will engage the abutment surface 38 to cause the actuating member 13 to shift or pivot about its axis to a first angular position relative to the main body portion 45. Similarly, when the abutment engaging surface 58 of lug 55 engages the abutment surface 37 of lug 34, abutment engaging edge 84 of lug 80 also will engage the abutment wall 37 to shift or pivot the actuating member 13 in an opposite direction and position the actuating member in a second angular position relative to the main body portion 45.

As best shown in FIGS. 3, 4 and 8, the forward end of actuating member 13 is provided with a radially disposed hole 86 in which there is guided a dog setting pin 87 yieldingly seated on a spring 88. The setting pin 87 extends through the opening 65 in the main body portion 45, into the transverse slot 61, and is provided with a rounded outer end 89 which engages the inner cam surface 73a of the dog 12. As shown in FIG. 1, the setting pin 87 is disposed in diametrically opposed relation to the lug 80 so that when the abutment engaging edge 85 engages abutment surface 38 of stop lug 34, the setting pin 87 will be pivoted to cam the dog and cause the abutment engaging surface 74 to be urged out of transverse slot 61, and when the abutment engaging edge 84 of lug 80 engages the abutment surface 37 of lug 34, the actuating member 34 will be shifted or will pivot about its axis to cause setting pin 87 to cam the dog 12 so that abutment engaging surface 75 is urged out of the transverse slot 61.

The range of angular displacement of actuating member 13 relative to main body portion 45 is limited by means of a set pin 90 threaded into a radially disposed threaded hole 91 in the main body portion 45, having the inner end 90a thereof received within a circumferentially extending slot 92 in the cylindrical wall 76 of the actuating member. The actuating member 13 yieldably is retained at the ends of its angular displacement relative to main body portion 45 by means of a ball 93 urged into engagement with the cylindrical surface 76 of the actuating member and received in circumferentially spaced recesses 94 and 95 by means of a spring 96 disposed in a radial opening 97 in the main body portion 45 and seated on a set screw 98 threaded into the opening 97. As best illustrated in FIG. 1, it will be noted that the ball recesses 94 and 95 are circumferentially spaced the same distance as the length of the groove 92.

To assemble the tool holder device as illustrated in the drawings, the stop lug 34 is first inserted in the cylindrical socket 17 and secured in position on the rear end wall 19 with the screw 42 provided with the spring 43, to permit limited longitudinal movement of the lug 34. Next, the retainer plate 25 is inserted in the cylindrical socket 17, and secured in position against rear end wall 19 with screws 28 and 29 so that stop lug 34 extends forwardly between the angularly spaced edges 30 and 31 of retainer plate 25, and radially disposed flanges 40 and 41 of stop lug 34 are received within slots 32 and 34.

The tool holder member 11 is then assembled by inserting the actuating member 13 in the bore 54. The actuating member 13 is retained in position by means of screw 92 which is threaded into opening 91 os that tip portion 90a thereof is received within circumferentially disposed slot 92. The ball 93 and spring 96 are then inserted in hole 97 and retained therein by means of set screw 98. With the actuating member 98 in position, it is rotated so that the radial hole 86 registers with the opening 65 in the main body portion 45. The spring 88 then is inserted through the opening 65 into the radial hole 86, and the dog setting pin 87 also is inserted in the radial hole 86 and seated on the spring 88. The dog 12 then is ready to be secured on the tool holding member. This is accomplished by rotating the actuating member 13 so that the dog setting pin 87 registers with the axis of openings 67 and 68, inserting the dog 12 in the transverse slot 61 and positioning it so that the cam surface 73a is seated on the curved outer end 89a of the setting pin 87, and the opening in the dog is aligned with openings 67 and 68 to permit the pivot pin 66 to be inserted through the aligned openings.

The assembled tool holder member 11 then is mounted on the tool holder support member 10 by inserting the main body portion 45 thereof into the cylindrical socket 17 of the support member so that the cylindrical surface 47 of the holder member is rotatably mounted on the cylindrical surface 18 of the support member. The assembly of the device is completed by inserting a spring 99 into the socket 17 so that the rear end thereof is seated on the annular shoulder 50 of main body portion 45 of the holder member, the end wall member 22 is mounted on the mounting shank portion 46 and forced against the action of the spring 90 to engage the annular shoulder 21, and then, while holding the wall member 22 in place, inserting the retaining ring 23 in the annular groove 24. The assembled tool holder device is then ready to be placed in a machine such as a turret lathe or an automatic screw machine to perform various thread cutting operations with an appropriate tool mounted on the free end of the mounting shank portion 46.

Assuming the tool holder device is to be used on a turret lathe to form internal threads in a workpiece, the assembled device is mounted on the turret lathe by inserting the mounting shank 15 of support member 10 in an appropriate opening in the turret of the lathe, and rigidly securing the shank in such position. With the turret properly oriented, the axis of the tool holder device will be disposed coaxially with a workpiece mounted in the chuck disposed on the spindle of the lathe. The chuck 52 is then mounted on the shank portion 46 and the tap 53 is positioned in the chuck 52 as illustrated in FIG. 1 of the drawings. The mounting of the tool 53 in the chuck 52 will position the tap 53 coaxially with the workpiece to be threaded.

In the operation of the tool holder device for tapping a right hand thread in a workpiece, the device is mounted in the turret of a lathe as described and a right hand tap is rigidly secured in the chuck 52. The spindle on which the workpiece is rigidly mounted is then driven in a forward direction (clockwise direction relative to FIGS. 3, 4, 6 and 8) and the controls of the lathe further are operated to cause the turret assembly with the tool holder device rigidly mounted thereon to be fed toward the workpiece. Upon engagement of the tap 53 with the workpiece, the tool holder member 11 will be caused to rotate with the workpiece until the abutment engaging surface 59 of lug 55 engages abutment surface 38 of stop lug 34 to restrict the rotation of the tool holder member 11 in a forward direction relative to the stationary tool holder support member 10. Thereafter, with the workpiece being rotated in a forward direction, the tap 53 being held against rotation in a forward direction the and the tool holder device being fed toward the workpiece, the tap 53 will operate to enter and cut threads in the workpiece. Also, upon engagement of the abutment engaging surface 59 with the abutment surface 38 of stop lug 34, the abutment engaging edge 85 of lug 80 will engage abutment surface 38 to cause the actuating member 13 to pivot in a reverse direction (counterclockwise relative to FIG. 6) cause dog setting pin 87 to pivot in a reverse direction whereby the dog 12 is pivoted about the axis of pin 66 to cause abutment engaging edge 74 to be biased outwardly beyond the confines of transverse slot 61.

The tap 53 continues to be fed into the workpiece until the forward movement of the turret assembly is limited by a stop provided on the lathe. When the feeding movement of the tool holder device ceases, the rotation of the newly formed threads in the workpiece will cooperate with the nonrotating tap 53 to cause the tap to be drawn forwardly. As the tap 53 moves forwardly, the tool holder member 11 correspondingly is caused to move forwardly while the tool holder support member 10 remains stationary. The axial displacement of the holder member 11 relative to the support member 10 will cause the abutment engaging surface 59 and abutment surface 38 to disengage. Upon disengagement of abutment engaging surface 59 and abutment surface 38, the tap 53 and holder member 11 will be free to rotate and will then begin to rotate in a forward direction with the workpiece. As the surfaces 59 and 38 are being displaced axially, the force applied by the lug 55 on the stop lug 34, will cause the stop lug 34 to be drawn forwardly a slight distance permitted by the radial slots 32 and 33. As soon as lugs 55 and 34 are disengaged, the spring 43 will urge the stop lug 34 rearwardly, clear of the end surface 60 of lug 55, to provide a positive clearance between the lugs 55 and 34.

To remove the tap 53 from the workpiece, the controls of the lathe are operated to reverse the direction of the workpiece. As this occurs, the workpiece will be driven in a reverse direction and, initially, the tap 53 and the tool holder member 11 also will be caused to be rotated with the workpiece in the reverse direction. However, upon rotation of the holder member 11 in the reverse direction with the dog setting pin in the set position as illustrated in FIG. 3, the dog 12 will be caused to pivot as it passes slot 45 to cause abutment engaging surface 74 to move out of the transverse slot 61 and engage abutment surface 47 on the support member 10. Upon engagement of abutment engaging surface 74 with the abutment surface 47, as illustrated in FIG. 4, whereby further rotation of the holder member 11 in the reverse direction relative to the support member 10 will be prevented. Accordingly, with the workpiece rotating in the reverse direction, the tap 52 being prevented to rotate in the reverse direction with the workpiece and the tap 53 and the holding device being free to move rearwardly, the newly formed threads in the workpiece will cooperate with the tap 52 to cause the tap to be threaded out of the workpiece. As soon as the tap is clear of the workpiece, the spring 99 will operate to urge the holder member 11 rearwardly toward retainer plate 25 to permit reengagement of lugs 55 and 34 upon rotation of the holder member. With the threading operation on the workpiece completed, the finished workpiece may be removed from the chuck and the next workpiece may be positioned for the next threading operation. In the meantime, the tool holding device is automatically reset for the next threading operation without any further adjustment.

Assuming it next is desired to tap a workpiece with a left hand thread, the only adjustment necessary to the tool holder device is the replacement of the right hand tap with a left hand tap. As soon as this is accomplished, the controls of the lathe are operated to cause the workpiece to be rotated in a reverse direction (counterclockwise relative to FIGS. 3, 4, 6 and 8), and further cause the turret assembly again to feed the tap toward the workpiece. Upon initial engagement of the left hand tap with the workpiece, the tap and tool holder member 11 will be caused to rotate in a reversed direction with the workpiece until the abutment engaging surface 58 of lug 55 engages the abutment surface 37 of stop lug 34. When this occurs, the rotation of the top and holder member 11 in the reverse direction will be prevented so that upon continued feeding of the nonrotating tap into the rotating workpiece, threads will be cut in the workpiece.

The engagement surface 58 of lug 55 with the abutment surface 37 of stop lug 34 further will cause the abutment engaging edge 84 of lug 80 to engage abutment surface 37 to cause the actuating member 13 to pivot relative to the holder member 11 so that the dog setting pin 87 will pivot to a second position as illustrated in FIG. 8. With the dog setting pin 87 in the position as illustrated in FIG. 8, the dog 12 will be biased to pivot about the pin 66 so that the abutment engaging surface 75 will be urged out of the transverse slot 61.

Similar to the operation of the device in forming a right hand thread, when the feeding action of the tool holder device stops by virtue of the engagement of the turret assembly with a feed stop, the rotating of the newly formed threads in the workpiece will act on the tap to cause the tap and holder member 11 to continue to move in a forward direction until the abutment engaging surface 58 and abutment surface 37 become disengaged to permit the tap and holder member 11 to rotate in the reverse direction with the workpiece. As the holder member 11 rotates in the reverse direction with the workpiece, the arcuate surface 73 of the dog member is caused to ride over the abutment surface 47 so as not to prevent the rotation of the holder member. However, upon operating the controls of the lathe to rotate the workpiece in an opposite or forward direction, the holder member 11 also will rotate in the forward direction until the dog 12 is urged into the slot 45 and the abutment engaging surface 75 engages abutment surface 46, as shown by the phantom lines in FIG. 8, to prevent any further rotation of the holder member 11 in the forward direction. When this occurs, and with the workpiece continuing to rotate in the forward direction and the turret assembly permitting the holder device to move rearwardly, the newly formed threads in the workpiece will cooperate with the tap to thread the tap out of the workpiece. As soon as the tap clears the workpiece, the spring 99 operates again to urge the holder member 11 rearwardly into engagement with the retainer plate 25, and the device again is automatically reset for the next threading operation.

The positioning of the tip portion 90a of screw 90 in the circumferentially extending groove 92 permits the dog setting pin 87 to properly engage the cam surface 73a and cam the dog member, and further to prevent the cam engaging end of the pin 87 from overriding the ends of the cam 73a. Furthermore, the seating of the spring urged ball 93 in recesses 94 and 95 operates to yieldingly retain the dog setting pin 87 in position urging either of the abutment engaging surfaces 74 and 75 outwardly for engagement with abutment surfaces 46 and 47.

In forming either right hand or left hand external threads on a workpiece, essentially the same operation as described is followed, with the exception of the use of die cutting tool in lieu of a tap, as is well known in the art. It further is contemplated that any type of tool mounting device can be used which would be mounted on the mounting shank portion 46 of the tool holding member.

From the description of the construction and operation of the aforementioned embodiment of the invention, it will be seen that the present invention can be utilized form either right hand or left hand threads on a workpiece merely by changing the thread forming tool.

The invention, residing in the device for holding the tool, is operable to automatically set to accommodate either the forming of right hand or left hand threads thereby resulting in a valuable reduction in machining time and costs.

Also from the foregoing detailed description, it will be evident that there are a number of changes, adaptations and modifications of the present invention which come within the province of those persons having ordinary skill in the art to which the present invention pertains. However, it is intended that all such variations not departing from the spirit of the invention be considered as within the scope thereof as limited solely by the appended claims.

I claim:

1. A tool holding device adapted for use in a machine tool including a frame, means for holding a workpiece, rotatably mounted on said frame, means for rotating said workpiece holding means selectively in a first direction and a second, opposite direction, tool holder mounting means mounted on said frame, means mounted on said frame operatively connected to said tool holder mounting means for moving said tool holder mounting means longitudinally selectively toward and away from said workpiece holding means, and means disposed on said frame for limiting the movement of said tool holder mounting means toward said workpiece holding means, comprising a tool holder support member mountable on said tool holder mounting means for longitudinal movement therewith, a tool holder member mounted on said tool holder support member for rotatable and axial movement relative thereto, said tool holder member having means for mounting thereon, a tool disposable coaxially and engageable with said workpiece, first means mounted on said tool holder support and tool holder members operatively engageable upon a first predetermined axial and angular relationship between said tool holder support and tool holder members for preventing the rotation of said tool holder member relative to said tool holder support member in said first direction, second means mounted on said tool holder support and tool holder members operatively engageable upon a second predetermined axial and angular relationship between said tool holder support and tool holder members for preventing the rotation of said tool holder member relative to said tool holder support member in said second, opposite direction, means operatively interconnecting said tool holder and tool holder support members for urging said first and second rotation preventing means toward operative engagement, third means mounted on one of said tool holder support and tool holder members disposable in a first position to engage the other of said tool holder support and tool holder members to prevent the rotation of said tool holder member in said second direction when said first and second rotation preventing means are operatively disengaged, and disposable in a second position to engage said other of said tool holder support and said tool holder members to prevent rotation of said tool holder member relative to said tool holder support member in said first direction when said first and second rotation preventing means are operatively disengaged, and actuating means operable responsive to said first predetermined axial and angular relationship between said tool holder and tool holder support members for moving said third rotation preventing means into said first position and operable responsive to said second predetermined axial and angular relationship between said tool holder and tool holder support members for moving said third rotation preventing means into said second position.

2. A tool holding device according to claim 1 wherein said means for mounting a tool on said tool holder member comprises means for mounting a thread cutting tool.

3. A tool holding device according to claim 1 wherein said means for mounting a tool on said tool holder member comprises means for removably mounting a tap thereon.

4. A tool holding device according to claim 1 wherein said means for mounting a tool on said tool holder member comprises means for removably mounting a die for cutting external threads.

5. A tool holding device according to claim 1 including means for selectively yieldably biasing said third rotation preventing means in said first and second positions to permit rotation of said tool holder member in one direction while preventing rotation in the opposite direction.

6. A tool holding device according to claim 1 including means for yieldably retaining said actuating means in selected positions thereby correspondingly retaining said third rotation preventing means in one of said first and second positions.

7. A tool holding device according to claim 1 including means mounted on said actuating means for selectively, yieldably biasing said third rotation preventing means in said first and second positions to permit rotation of said tool holder member in one direction while preventing rotation thereof in the opposite direction, and means operatively interconnecting one of said tool holder support and tool holder members, and said actuating means, for yieldingly retaining said actuating means in selected positions thereby correspondingly retaining said third rotation preventing means in one of said first and second positions.

8. A tool holding device according to claim 1 including means disposed on one of said tool holder support and tool holder members for providing positive operative disengagement of said first and second rotation preventing means.

9. A tool holding device according to claim 1 wherein said means operatively interconnecting said tool holder and tool holder support member for urging said first and second rotation preventing means toward operative engagement comprises a spring.

10. A tool holding device according to claim 1 wherein said third rotation preventing means comprises a dog pivotally mounted on one of said tool holder and tool holder support members, said dog having a pivotal axis disposed parallel to the axis of rotation of said tool holder member and surfaces engageable with abutment surfaces on said other of said tool holder support and tool holder members when said dog is disposed in said first and second positions.

11. A tool holding device according to claim 1 wherein said first and second rotation preventing means include engageable surfaces on said tool holder support and tool holder members, radially disposed relative to the rotational axis of said tool holder member.

12. A tool holding device adapted for use in a machine tool including a frame, means for holding a workpiece, rotatably mounted on said frame, means for rotating said workpiece holding means selectively in a first direction and a second, opposite direction, tool holder mounting means mounted on said frame, means mounted on said frame operatively connected to said tool holder means for moving said tool holder mounting means longitudinally selectively toward and away from said workpiece holding means, and means disposed on said frame for limiting the movement of the tool holder mounting means toward said workpiece holding means, comprising a tool holder support member, said tool holder support member having a cylindrical chamber including a front and rear walls, and means for mounting said tool holder support member on said tool holder mounting means for longitudinal movement therewith whereby said cylindrical chamber will be disposed coaxially with said rotatable workpiece holding means, a tool holder member, said tool holder member having a cylindrical body portion disposed in said cylindrical chamber of said tool holder support member and an axially disposed shank portion projecting through an opening in the front wall of said cylindrical chamber whereby said tool holder member is rotatably and axially movable relative to said tool holder support member, said tool holder member having means for mounting on said shank portion, a tool disposable coaxially and engageable with a workpiece mounted on said rotatable workpiece holding means, first means mounted on said tool holder support and tool holder members operatively engageable upon a first predetermined axial and angular relationship between said tool holder and tool holder support members for preventing the rotation of said tool holder member relative to said tool holder support member in said first direction, second means mounted on said tool holder and tool holder support members operatively engageable upon a second predetermined axial and angular relationship between said tool holder and tool holder members for preventing the rotation of said tool holder member relative to said tool holder support member in said second direction, means operatively interconnecting said tool holder and tool holder support members for urging said first and second rotation preventing means toward operative engagement, third means mounted on said tool holder member disposable in a first position to engage said tool holder support member to prevent rotation of said tool member in said second direction when said first and second rotation preventing means are operatively disengaged, and disposable in a second position engageable with the said tool holder support member to prevent rotation of said tool holder member relative to said tool holder support member is said first direction when said first and second rotation preventing means are operatively disengaged, and actuating means operable responsive to said first predetermined axial and angular relationship between said tool holder and tool holder support members for moving said third rotation preventing means into said first position and operable responsive to said second predetermined axial and angular relationship between said tool holder and tool holder support members for moving and third rotation preventing means into said second position.

13. A tool holding device according to claim 12 wherein said means for mounting a tool on the shank portion of said tool holder member comprises means for mounting a thread cutting tool.

14. A tool holding device according to claim 12 including means for selectively, yieldably biasing said third rotation preventing means in said first and second positions to permit rotation of said tool holder member in one direction while preventing rotation thereof in the opposite direction.

15. A tool holding device according to claim 12 including means for yieldably retaining said actuating means in selected positions thereby correspondingly retaining said third rotation preventing means in said first and second positions.

16. A tool holding device according to claim 12 including means for selectively, yieldably biasing said third rotation preventing means in said first and second positions to permit rotation of said tool holder member in one direction while preventing rotation thereof in the opposite direction, and means for yieldingly retaining said actuating means in selected positions thereby correspondingly retaining said rotation preventing means in one of said first and second positions.

17. A tool holding device according to claim 12 including means disposed on one of said tool holder support and tool holder members for providing positive operative disengagement of said first and second rotation preventing means.

18. A tool holding device according to claim 12 wherein the cylindrical body portion of said tool holder member is provided with a rotatable stop lug projecting toward the rear wall of said cylindrical chamber and said tool holder support member is provided with a stationary stop lug projecting from the rear wall of said cylindrical chamber toward said tool holder member, and said first rotation preventing means comprises a first pair of engageable, radially disposed surfaces disposed on said stop lugs, and said second rotation preventing means comprises a second pair of engageable, radially disposed surfaces disposed on said stop lugs.

19. A tool holding device according to claim 18 wherein said means operatively interconnecting said tool holder and tool holder support member for urging said first and second rotation preventing means toward operative engagement comprises a spring interposed between the front wall of said cylindrical chamber and a front wall of the cylindrical body portion of said tool holder member.

20. A tool holding device according to claim 18 wherein the cylindrical body portion of said tool holder member is provided with an axially disposed bore and said actuating means comprises a cylindrical member rotatably mounted in said bore, having an axially offset, rearwardly projecting actuating lug disposed substantially in radial alignment with the rotatable stop lug of the cylindrical body portion of said tool holder member, and having a pair of edges spaced circumferentially a distance slightly greater than the innermost circumferential dimension of the angularly spaced walls of said rotatable stop lug of the cylindrical body portion of said tool holder member whereby when said first pair of surfaces on said rotatable and stationary stop lugs of said tool holder and tool holder support members engage, a first edge of said actuating lug will engage a surface of the stationary stop lug of said tool holder support member to pivot said cylindrical member to a first position and when said second pair of engaging surfaces on said rotatable and stationary stop lugs of said tool holder and tool holder support members engage, a second edge of said actuating lug will engage a surface of the stationary stop lug of said tool holder support member to pivot said cylindrical member to a second position, and said cylindrical member having means operatively connected to said third rotation preventing means for moving said third rotation preventing means to said first position there of when said cylindrical member is disposed in said first position thereof and moving said third rotation preventing means in said second position thereof when said cylindrical member is disposed in said second position thereof.

21. A tool holding device according to claim 20 including means for restricting the pivotal movement of said cylindrical member between said first and second positions thereof.

22. A tool holding device according to claim 20 including means for selectively, yieldably retaining said cylindrical member in one of said first and second positions thereof.

23. A tool holding device according to claim 20 wherein the cylindrical body section of said tool holder member is provided with a transverse slot and a radially disposed opening interconnecting said axial bore and said transverse slot, said third rotation preventing means comprises a dog disposed in said slot, pivotally connected to the front and rear walls thereof, said dog having a pivotal axis disposed parallel to the axis of said tool holder member, and a pair of first and second edges disposed on opposite sides of the pivotal axis thereof, a first of said edges being engageable with a first abutment surface on said tool holder support member when said dog is in said first position to permit rotation of said tool holder member in said first direction while preventing rotation of said tool holder member in said second, opposite direction and a second of said edges being engageable with a second abutment surface on said tool holder support member when said dog is in said second position to prevent rotation of said tool holder member in said first direction and permit rotation of said tool holder member in said second opposite direction, and said means operatively interconnecting said cylindrical member and said dog comprising a pin yieldingly seated in a radially disposed seat in said cylindrical member, extending through said radial opening in the cylindrical body portion of said tool holder member and engaging a cam surface on said dog whereby when said cylindrical member is pivoted by the actuating lug thereof to said first position said pin correspondingly will be pivoted to engage the cam surface of said dog and move said dog to said first position thereof, and when said cylindrical member is pivoted by the actuating lug thereof to said second position said pin correspondingly will be pivoted to engage the cam surface of said dog and move said dog to said second position thereof.

24. A tool holding device according to claim 23 including means for limiting the pivotal movement of said cylindrical member between said first and second positions thereof.

25. A tool holding device according to claim 23 including means for selectively, yieldably retaining said cylindrical member in said first and second positions thereof.

26. A tool holding device according to claim 23 wherein the abutment surfaces of the tool holder support member engageable by said first and second edges of said dog, comprise circumferentially spaced surfaces of a recess formed in the cylindrical wall of said cylindrical chamber.

* * * * *